Feb. 2, 1971     J. L. ORNSTEIN ET AL     3,560,171
THERMOSTAT METAL
Filed May 1, 1968     2 Sheets-Sheet 1
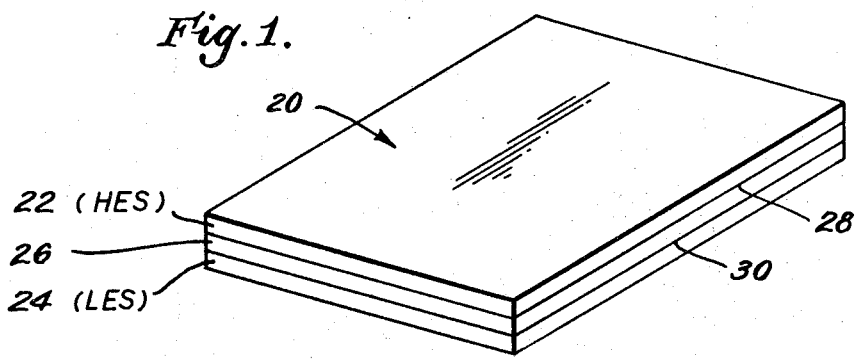
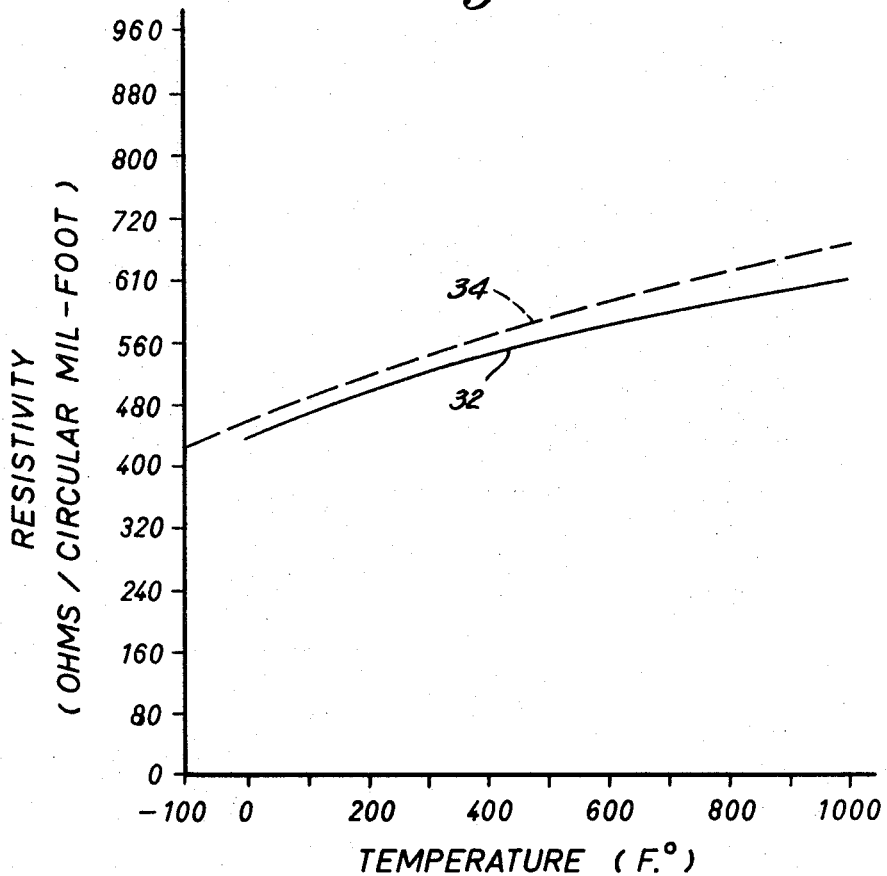
Inventors:
Jacob L. Ornstein,
Ernest R. Howard,
Seth R. Thomas,
by James C. McAndrew
Att'y.

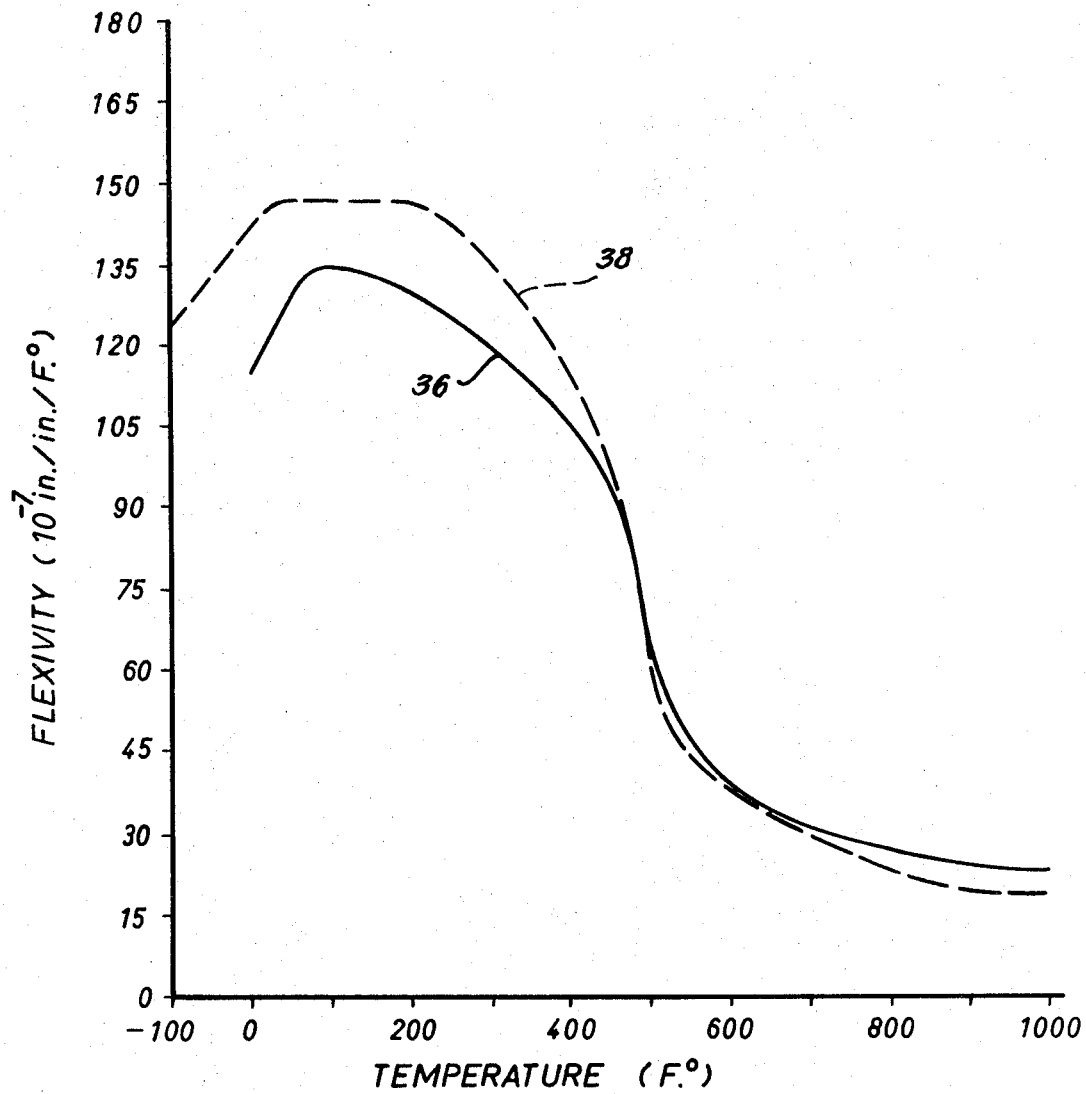

United States Patent Office 3,560,171
Patented Feb. 2, 1971

3,560,171
THERMOSTAT METAL
Jacob L. Ornstein, Norton, Ernest R. Howard, Attleboro, and Seth R. Thomas, Plainville, Mass., assignors to Texas Instruments Incorporated, Dallas, Tex., a corporation of Delaware
Filed May 1, 1968, Ser. No. 725,724
Int. Cl. B32b 15/00
U.S. Cl. 29—195.5                                    6 Claims

ABSTRACT OF THE DISCLOSURE

A three-layer, composite thermostat material of high flexivity and electrical resistivity and low cost is shown to comprise a layer of metal of relatively high coefficient of thermal expansion embodying a chromium-nickel-iron alloy and a layer of metal of relatively low coefficient of thermal expansion embodying a nickel-iron alloy, these metal layers being metallcrgically bonded to opposite sides of an intermediate metal layer of stainless steel. The resistivity, corrosion resistance, strength, work-hardening properties, and ability to withstand high temperatures of the intermediate metal layer cooperate with the corresponding characteristics of the high and low expansion materials bonded thereto to provide an economical, composite thermostat material having a resistivity, flexivity, corrosion resistance, useful deflection temperature range, strength, and ability to withstand high temperatures comparable to composite thermostat materials previously achieved only at substantially greater cost.

---

A widely used, commercially-available two-layer composite thermostat material embodies equally thick layers of two metals of relatively high and relatively low coefficients of thermal expansion respectively, the high expansion material comprising an alloy embodying about 22% nickel, 3% chromium and the balance iron and the low expansion material comprising an alloy embodying about 36% nickel and the balance iron. This thermostat material is characterized by high flexivity and resistivity as well as by good corrosion resistance, high strength, and ability to withstand high temperatures without deleterious effect. The material also has a good useful deflection temperature range in that the material retains significant flexivity even at relatively high temperatures on the order of 700° F. As a result of these desirable characteristics, the material has been very widely used in preparing thermally-responsive members in circuit breakers, motor protectors and the like. Unfortunately, the materials utilized in this conventional thermostat metal are quite expensive and embody a substantial nickel content, nickel being a material of somewhat limited availability.

It is an object of this invention to provide a novel and improved composite thermostat material; to provide such a material which is easily processed and which is characterized by high flexivity, high resistivity, good corrosion resistance, high strength, a broad range of temperature at which the material provides useful deflection and the ability to withstand high temperatures without deleterious effect; and to provide such a material which is of relatively low cost and which embodies a relatively small proportion of nickel-bearing material.

Other objects and advantages and details of the composite material provided by this invention appear in the followed detailed description of preferred embodiments of the material, this description referring to the drawings in which:

FIG. 1 is a perspective view of the composite material of this invention; and
FIGS. 2 and 3 are graphs illustrating characteristics of the composite materials of this invention.

Referring to the drawings, 20 in FIG. 1 indicates the novel and improved three-layer composite thermostat metal provided by this invention which is shown to include a layer of metal 22 of relatively high coefficient of thermal expansion, a layer of metal 24 of relatively lower coefficient of thermal expansion, and an intermediate layer of metal 26. The outer metal layers 22 and 24 are of equal thickness and are metallurgically bonded, preferably solid-phase bonded, to the intermediate metal layer 26, the bonds between the metal layers extending substantially throughout the entire contiguous surfaces of the layers of the composite material as indicated at the interfaces 28 and 30 in FIG. 1. Preferably, the metal layers are solid-phase bonded together in the manner described, for example, in U.S. Pats. Nos. 2,691,815 and 2,753,623. However, other conventional methods could also be employed for metallurgically bonding the layers together within the scope of this invention. In this way, the composite material 20 forms an integral unit which is adapted to flex in response to temperature change as will be understood. The thickness of the composite material 20 preferably varies from 0.001 to 0.100 inch within the scope of this invention.

In accordance with this invention, the high expansion layer 22 of the composite material comprises a nickel-chromium-iron alloy preferably embodying about 22% nickel and 3% chromium by weight and the balance iron. In the preferred embodiment of this invention, the low expansion metal layer 24 comprises a nickel-iron alloy preferably embodying about 36% nickel by weight and the balance iron. The alloys above described are hereinafter identified as Alloy B and Alloy 10 respectively.

In accordance with this invention, the intermediate layer 26 of the composite material 20 preferably comprises a stainless steel such as the alloy embodying 0.012% maximum carbon, 1.00% maximum manganese, 1.00% maximum silicon, 14%–18% chromium by weight and the balance iron, which alloy is commercially identified as 430 Stainless Steel and is hereinafter identified as Alloy 70.

All the metals embodied in the composite material 20 are characterized by suitably high resistivity as follows:

|  | Resistivity, ohm/circular mil-foot |
|---|---|
| Alloy B | 460 |
| Alloy 10 | 484 |
| Alloy 70 | 404 |

As a result, the thickness of the intermediate layer 26 of the composite material 20 is readily varied to constitute from 10% to 90% of the total thickness of the composite material and provides a resistivity of as high as 410 ohms/circular mil-foot at 75° F. even when the layer 26 comprises 90% of the total composite thickness. In fact, as illustrated by curve 32 in the graph of FIG. 2 where the layers 22, 24 and 26 each comprises 33⅓ of the total thickness of the composite material 20, the composite 20 has a resistivity of 447 ohms/circular mil-foot at 750° F. and the resistivity of composite material 20 over a wide temperature range corresponds to at least about 92% of the resistivity of the more expensive two-layer composite thermostat material of the prior art which embodies only Alloy B and Alloy 10 as above described, the resistivity of the prior art material being indicated in FIG. 2 by curve 34.

The metals of the layers 22 and 24 of the composite material 20 have siutably different coefficients of thermal expansion as follows to provide the composite material 20 with high flexivity, the layer 26, because of its central position in the composite, having only a limited effect on the flexivity of the composite:

| | Coefficient of thermal expansion, in./in./° F. |
|---|---|
| Alloy B | $10.5 \times 10^{-6}$ |
| Alloy 10 | $0.7 \times 10^{-6}$ |
| Alloy 70 | $5.7 \times 10^{-6}$ |

Thickness of the intermediate layer 26 on the composite material is readily varied to constitute from 10% to 90% of the total thickness of the composite material while achieving a flexivity of about 20 in./in./°F. at 75° F. even when the intermediate layer 26 comprises as much as 90% of the total composite thickness. The term "flexivity" as used herein relates to the deflection per degree of temperature change per unit of thickness as calculated according to the procedure established by the American Society for Testing Materials. In fact, as illustrated by curve 36 in the graph of FIG. 3, where the layers 22, 24 and 26 each comprise 33⅓% of the total composite thickness, the composite 20 has a flexivity of $133 \times 10^{-7}$ in./in./° F. at 100° F. and the flexivity of the composite material 20 corresponds over a wide temperature range to at least about 90% of the flexivity of the more expensive two-layer composite thermostat material of the prior art which embodies only Alloy B and Alloy 10 as above described, the flexivity of the prior art material being illustrated in curve 38 in FIG. 2.

The composite material 20 is also characterized by useful deflection over a wide range of temperatures. That is, the material continues to provide useful change in deflection per degree change in temperature from temperatures as low as −100° F. to temperatures as high as about 700° F. as indicated in the graph of FIG. 3.

The materials of the layers 22, 24 and 26 are all characterized by good corrosion resistance; all of the materials are able to withstand temperatures above 1,000° F. without deleterious effects; and all of the materials have compatible work-hardening properties and the like so that the materials are easily secured together by roll bonding and the like with accurate control of layer thickness in the resulting composite material. Further, the intermediate layer 26 has a modulus of elasticity of 29,000,000 p.s.i. compared to 28,000,000 for the material of layer 22 and 21,400,000 p.s.i. for the material of layer 24 and therefore contributes significantly to the stiffness of the composite material 20. For example, where the composite material 20 embodies layers 22, 24 and 26 of equal thickness, the modulus of elasticity of the composite material is 24,000,000 p.s.i.

It is found that, although the thickness of the outer layers 22 and 24 of the composite material should be substantially equal, the thickness of the intermediate layer 26 can be varied over a substantial range to provide an economical thermostat metal having suitably high resistivity and flexivity. That is, the cost of the composite material of this invention is substantially reduced as the thickness of the intermediate layer 26 of the composite material is increased. For example, where the thickness of the intermediate layer 26 comprises 90% of the total composite thickness, the cost of the composite material can be as low as about 40% of the cost of an equal thickness of the two-layer composite thermostat material embodying Alloy B and Alloy 10 known in the prior art.

In a preferred embodiment of this invention, the composite material 20 embodies metal layers 22, 24 and 26 which each comprise about ⅓ of the total thickness of the composite material. This material is characterized by resistivity, flexivity, corrosion resistance, useful deflection temperature range, and ability to withstand high temperature comparable to the composite two-layer material known in the prior art which embodies only Alloy B and Alloy 10 as above described. This preferred composite thermostat metal is further characterized by greater stiffness, by ease in processing, by substantially lower cost, and by use of only a limited proportion of nickel-bearing materials.

It should be understood that although particular embodiments of this invention have been described by way of illustration, this invention includes all modifications and equivalents thereof which fall within the scope of the appended claims.

We claim:

1. A composite thermostat material comprising a layer of a metal alloy of relatively high coefficient of thermal expansion embodying by weight approximately 22% nickel, 3% chromium and the balance iron, a layer of metal alloy of relatively lower coefficient of thermal expansion embodying by weight, approximately 36% nickel and the balance iron, and an intermediate, substantially nickel-free, steel alloy layer, said high and low expansion metal layers being metallurgically bonded to respective opposite sides of said intermediate layer to form said composite material.

1. A composite thermostat material comprising a layer of metal of relatively high coefficient of thermal expansion embodying, by weight, approximately 22% nickel, 3% chromium, and the balance iron; a layer of metal of relatively lower coefficient of thermal expansion embodying, by weight, approximately 36% nickel and the balance iron; and an intermediate layer of metal embodying, by weight, approximately 0.012% maximum carbon, 1.00% maximum manganese, 1.00% maximum silicon, 14% to 18% chromium and the balance iron; said high and low expansion metal layers being metallurgically bonded to respective opposite sides of said intermediate layer.

3. A composite material as set forth in claim 2 wherein said high and low expansion metal layers are of equal thickness.

4. A composite material as set forth in claim 3 wherein said intermediate layer has a thickness comprising 10% to 90% of the total thickness of the composite material.

5. A composite material as set forth in claim 4 wherein said intermediate layer comprises approximately 33% of the total thickness of the composite material.

6. A composite material as set forth in claim 5 wherein said high and low pressure expansion metal layers are solid-phase bonded to said respective opposite sides of said intermediate layer.

References Cited

UNITED STATES PATENTS

| 2,240,824 | 5/1941 | Alban | 29—195.5 |
| 2,461,518 | 2/1949 | Chace | 29—195.5 |
| 3,102,793 | 9/1963 | Alban | 29—195.5 |
| 3,454,373 | 7/1969 | Ornstein | 29—195.5 |

HYLAND BIZOT, Primary Examiner